United States Patent Office 3,201,404
Patented Aug. 17, 1965

3,201,404
1-PHENYL-2-LOWERALKYL AND PHENYLLOWERALKYL - 4 - TERTIARY AMINO-3,5-DIOXO-1,2,4-TRIAZOLIDINES
Heinrich Ruschig, Bad Soden, Taunus, and Karl Schmitt, Leopold Ther, and Gerhard Vogel, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 24, 1962, Ser. No. 212,161
Claims priority, application Germany, July 26, 1961, F 34,534
8 Claims. (Cl. 260—294)

The present invention provides new basically substituted triazolidines and a process for preparing them.

We have found that new, therapeutically valuable, basically substituted triazolidines of the Formula I $$\begin{array}{c} R_1-N\!\!-\!\!-\!\!-\!\!C=O \\ \phantom{xxx}|\phantom{xxxxx}| \\ R-N\phantom{xx}N-A-Y \\ \phantom{xxx}\diagdown\!C\!\diagup \\ \phantom{xxxx}\| \\ \phantom{xxxx}O \end{array}$$

in which R represents a phenyl radical, $R_1$ represents a low molecular alkyl group or an aralkyl group having a low molecular alkylene portion, A represents a low molecular alkylene group containing at least 2 carbon atoms, and Y represents the groups $$\left\langle -N\begin{array}{c}R_2\\R_3\end{array}\right\rangle \quad \text{and} \quad \left[-N\begin{array}{c}CH_2-CH_2\\ \phantom{x}\\ [CH_2]_n-CH_2\end{array}CH_2\right]$$

wherein $R_2$ and $R_3$ each represent a low molecular alkyl group and $n$ represents 0 or 1, and physiologically tolerable salts of these compounds, are obtained by (a) reacting triazolidine derivatives of the Formula II $$\begin{array}{c} R_1-N\!\!-\!\!-\!\!-\!\!C=O \\ \phantom{xxx}|\phantom{xxxxx}| \\ R-N\phantom{xx}NH \\ \phantom{xxx}\diagdown\!C\!\diagup \\ \phantom{xxxx}\| \\ \phantom{xxxx}O \end{array} \qquad (II)$$

with reactive esters of alcohols of the formula HO—A—Y, or by (b) reacting triazolidine derivatives of the Formula III $$\begin{array}{c} R_1-N\!\!-\!\!-\!\!-\!\!C=O \\ \phantom{xxx}|\phantom{xxxxx}| \\ R-N\phantom{xx}N-A-X \\ \phantom{xxx}\diagdown\!C\!\diagup \\ \phantom{xxxx}\| \\ \phantom{xxxx}O \end{array} \qquad (III)$$

in which X represents a halogen atom or a sulfonyloxy group and R, $R_1$ and A each have the meanings given above, with compounds of the Formula H—Y, or by (c) reacting triazolidine derivatives of the Formula IV $$\begin{array}{c} R_1-N\!\!-\!\!-\!\!-\!\!C=O \\ \phantom{xxx}|\phantom{xxxxx}| \\ R-N\phantom{xx}N-A'=O \\ \phantom{xxx}\diagdown\!C\!\diagup \\ \phantom{xxxx}\| \\ \phantom{xxxx}O \end{array}$$

in which R and $R_1$ each have the meanings given above and A' corresponds to the radical A, with compounds of the Formula H—Y under reducing conditions, or by (d) alkylating, at the secondary or primary nitrogen atom, triazolidine derivatives of the Formula V $$\begin{array}{c} R_1-N\!\!-\!\!-\!\!-\!\!C=O \\ \phantom{xxx}|\phantom{xxxxx}| \\ R-N\phantom{xx}N-A-NH-R'_2 \\ \phantom{xxx}\diagdown\!C\!\diagup \\ \phantom{xxxx}\| \\ \phantom{xxxx}O \end{array}$$

in which $R'_2$ has the meaning given to $R_2$ and may also represent a a hydrogen atom, and, if desired, converting the compounds so obtained with the aid of inorganic or organic acids into the corresponding salts.

As substituents $R_1$ and A—Y, of the Formula I, there are mentioned by way of example:

$R_1$: methyl, ethyl, propyl, isopropyl, butyl, isobutyl, secondary butyl, isopentyl, benzyl, β-phenyl-ethyl, γ-phenyl-propyl, 3-phenyl-butyl-(1).

—A—Y: 2-dimethylamino-ethyl, 2-diethylamino-ethyl, 2-diisopropyl-amino-ethyl, 2-piperidino-ethyl, 2-pyrrolidino-ethyl, 1-dimethylamino-propyl - (2), 2 - dimethylamino-propyl-(1), 3-dimethylamino-propyl-(1), 1-dibutylamino-propyl-(2), 2-(2-methyl-piperidino)-ethyl, 3-piperidino-butyl-(1), 4-dimethylamino-butyl-(1).

In particular, the following 1,2-disubstituted 1,2,4-triazolidine-diones which correspond to the formula II may be used as starting products in the process of the present invention:

1-phenyl-2-methyl-3,5-dioxo-1,2,4-triazolidine,
1-phenyl-2-ethyl-3,5-dioxo-1,2,4-triazolidine,
1-phenyl-2-propyl-3,5-dioxo-1,2,4-triazolidine,
1-phenyl-2-isopropyl-3,5-dioxo-1,2,4-triazolidine,
1-phenyl-2-butyl-3,5-dioxo-1,2,4-triazolidine,
1-phenyl-2-isobutyl-3,5-dioxo-1,2,4-triazolidine,
1-phenyl-2-secondary butyl-3,5-dioxo-1,2,4-triazolidine.

The starting products which correspond to the Formula II can be prepared in known manner, for example, by reacting correspondingly 1,2-disubstituted semicarbazides with urea, phosgene, a carbonic acid ester or a chlorocarbonic acid ester.

The following amino alcohols may be used as reactive esters of, for example, hydrochloric acid, hydrobromic acid, hydriodic acid, sulfuric acid, methanesulfonic acid, benzenesulfonic acid, or p-toluenesulfonic acid, for the reaction with the 1,2-disubstituted triazolidines of the aforementioned type to yield the compounds of the Formula I:

β-dimethylamino-propanol-(1),
β-diethylamino-propanol-(1),
β-piperidino-propanol-(1),
β-dimethylamino-propanol-(2),
β-diethylamino-propanol-(2),
β-piperidino-propanol-(2),
β-diisopropylamino-propanol-(1),
β-diisopropylamino-propanol-(2),
β-(2-methyl-piperidino)-propanol-(1),
β-(4-methyl-piperidino)-propanol-(1),
β-(2-methyl-piperidino)-propanol-(2),
β-(4-methyl-piperidino)-propanol-(2),
3-dimethylamino-propanol-(1), and
3-dimethylamino-propanol-(2).

The method of carrying out the process of the invention as described under (a) which comprises reacting triazolidine derivatives of the Formula II with reactive esters of amino alcohols of the formula HO—a—Y is analogous to the methods conventionally used for alkylating phthalimides or other acid compounds. It is advantageous to carry out the reaction in isopropanol which contains the calculated quantity of sodium. In that case, the sodium salt of triazolidine-dione may separate in the form of a solid which, however, reacts rapidly with, for example, β-diethylamino-ethyl chloride, when heated to the boiling temperature. Since the reaction products have basic properties, they can easily be isolated and purified in the usual manner, for example, via a salt.

The other operational methods of the process of the invention also constitute known reactions. Thus, the triazolidine-diones that contain in 4-position an alkyl radical which is substituted by halogen atoms or a sulfonyl-oxy group derived from sulphuric acid, methane-sulfonic acid, benzene-sulfonic acid or p-toluenesulfonic acid, are reacted with amines; it is advantageous to use the amines in excess amounts and, if necessary, to carry out the reaction under pressure. The starting products may be prepared, for example, from 1,2-disubstituted triazolidine-diones and and corresponding dihalogeno-alkanes or by esterification of 4-(hydroxyalkyl)-triazolidine-diones. Equally as the starting products used in the other operational methods of the process of the invention, they may also be used as crude products, since on working up of the reaction mixture the products are obtained in the form of bases and can thus be purified by salt formation.

The triazolidines which contain in 4-position an alkyl group with a ketone or aldehyde function can be converted into the desired products in known manner, for example, by catalytical hydrogenation in the presence of corresponding amines with a free amino group or according to the method of Leuckart-Wallach with the aid of corresponding N-formyl-amines. The carbonyl group may be present in free or in acetalized form; in the latter case, the reaction is carried out in the presence of H-ions. The starting products of the Formula IV which contain carbonyl groups may be prepared, for example, by reacting triazolidine derivatives of the Formula II with corresponding halogeno-acetals and, if necessary, subsequently hydrolyzing the acetal grouping. If, for example, corresponding primary amines or ammonia instead of secondary amines are used in the reaction with triazolidine-diones of the Formula IV, there are obtained the starting products of the general Formula V which can be converted by alkylation in known manner into the desired products.

The products of the present invention can be converted in conventional manner into the corresponding salts with the aid of organic or inorganic acid. As organic acids, there may be used: acetic acid, malonic acid, propionic acid, lactic acid, succinic acid, tartaric acid, maleic acid, fumaric acid, citric acid, malic acid, benzoic acid, salicylic acid, hydroxyethane-sulfonic acid, aceturic acid, ethylene-diamine-tetracetic acid, and naphthalene-1,5-disulfonic acid. As inorganic acids, there may be used hydrohalic acids such as hydrochloric acid and hydrobromic acid; sulfuric acid, phosphoric acid, and amidosulfonic acid.

The new compounds obtained by the process of the present invention have in particular psychotropic properties while being physiologically well tolerated. For example, 1-phenyl-2-methyl-4-(β-diethylamino-ethyl)-3,5-dioxo-1,2,4-triazolidine exhibited in motility tests carried out on a mouse according to the method described by Ther (Süddeutsche Apoth. Zeitg., 1953, page 292), a sedative action. Tests on golden hamsters (*Mesocricetus aureatus*) according to the method described by Ther, Vogel and Werner (Arzneimittelforsch., 9, 351 (1959)) also showed the compounds to have a sedative action which, however, in contrast to the action of the usual commercial tranquillizers and narcotics such as Meprobamat or the barbiturates, was not accompanied by disturbances of the co-ordination capacity. When administered according to the method described by Vogel and Ther (Arzneimittelforsch., 10, 806 (1960)), the compounds produced also in cotton rats the same effect. Further, upon administration to a rat whose body temperature had been lowered to subnormal according to Giaja, the compounds exhibited a hibernatory action (method according to Vogel, Naunyn-Schiedeberg, Arch. exp. u. Pharmakol., 236, 214 (1959)).

Further, the injection of 1-noradrenaline to a cat in urethane-chloralose narcosis followed by the injection of a preparation containing a compound of the invention, resulted in a higher rate of blood pressure increase on the following 1-noradrenaline injections.

The products of the present invention may be administered either parenterally or orally, as such or in the form of their salts, if required in admixture with pharmaceutically acceptable adjuvants or carriers. In the case of oral administration, they are preferably used in the form of tablets or dragees which contain the products of the present invention as the active ingredients and the usual adjuvants or carriers such as lactose, starch, tragacanth, and magnesium stearate.

The following examples illustrate the invention but they are not intended to limit it thereto:

Example 1

(a) 48 g. of 1-phenyl-2-methyl-3,5-dioxo-1,2,4-triazolidine were aded to a solution of 5.8 g. of sodium in 800 cc. of isopropanol. A suspension of the sodium salt was obtained to which was added dropwise, at the boiling temperature, a solution of 37.2 g. of β-diethylamino-ethyl chloride in 120 cc. of toluene; the mixture was then heated for a further 2 hours at the boiling temperature. Water was added and the reaction mixture was then concentrated; the residue was taken up in ether. The ether solution was extracted by shaking with dilute hydrochloric acid and the hydrochloric extract was rendered alkaline with potassium carbonate. The 1-phenyl-2-methyl-4-(β-diethylaminoethyl)-3,5-dioxo-1,2,4-triazolidine that had separated was isolated by extraction with ether; after drying and evaporation of the ether solution, the compound was obtained in the form of an oil (60 g.) which could be purified via the oxalate (melting point 161° C.). The naphthalene-1,5-disulfonate was found to melt at 208° C., while the hydrochloride had a melting point at 75° C.

(b) The same compound was obtained by heating for some hours to 100° C. in a pressure vessel, 1-phenyl-2-methyl-4-(β-bromoethyl)-3,5-dioxo-1,2,4-triazolidine (melting point 74° C., prepared from 1-phenyl-2-methyl-3,5-dioxo-triazolidine by the reaction with 1,2-dibromo-ethane) with an excess quantity of diethylamine in benzene, extracting the reaction mixture by shaking with dilute acid and working up the acid extract as described under 1 (a).

Example 2

19.1 g. of 1-phenyl-2-methyl-3,5-dioxo-1,2,4-triazolidine were reacted according to the method described in Example 1 with 2.3 g. of sodium in 400 cc. of isopropanol and 15.8 g. of γ-dimethylamino-propylchloride. 24 g. of 1-phenyl-2-methyl-4-(γ-dimethylamino-propyl)-3,5-dioxo-1,2,4-triazolidine were obtained, whose hydrochloride, after recrystallization from isopropanol, was found to melt at 160–161° C.

Example 3

(a) To the potassium salt obtained from 19.1 g. of 1-phenyl-2-methyl-3,5-dioxo-1,2,4-triazolidine with a solution of 4.0 g. of potassium in 400 cc. of secondary butanol were added, at 80–90° C., 17.7 g. of β-piperidino-ethyl chloride, and subsequently, the mixture was heated for ½ hour to the boiling temperature. After the mixture had cooled, the potassium chloride was separated by suction-filtration and the filtrate was evaporated in a water-jet vacuum. The residue was taken up in benzene and in hydrochloric acid, and from the hydrochloric solution the base was precipitated as an oil by means of a sodium hydroxide solution and isolated in the usual manner. 25.8 g. of 1-phenyl-2-methyl-4-(β-piperidino-ethyl)-3,5-dioxo-1,2,4-triazolidine were obtained, the compound was converted into the hydrochloride which was found to melt at 170–171° C.

(b) The same compound was obtained by heating 1- phenyl-2-methyl-3,5-dioxo-1,2,4-triazolidine in benzene with a 10% excess quantity of sodium amide, while passing through anhydrous nitrogen, until the evolution of ammonia ceased, further heating for 1 hour to the boiling temperature the suspension of the triazolidine-sodium salt thus obtained and isolating the reaction product thus obtained.

Example 4

When reacting according to the method described under 1(a), 12 g. of 1-phenyl-2-methyl-3,5-dioxo-1,2,4-triazolidine with a solution of 1.5 g. of sodium in 250 cc. of isopropanol and 7.5 g. of β-dimethylamino-ethyl chloride, there were obtained 13 g. of 1-phenyl-2-methyl-4-(β-dimethylamino-ethyl)-3,5-dioxo-1,2,4-triazolidine base. The hydrochloride was found to melt at 188° C. (from isopropanol).

Example 5

21.9 g. of 1-phenyl-2-isopropyl-3,5-dioxo-1,2,4-triazolidine (melting point 160° C.) were reacted as described under 1 (a) with 2.3 g. of sodium in 400 cc. of isopropanol and 14.9 g. of β-diethylamino-ethyl chloride. 22.2 g. of 1-phenyl-2-isopropyl-4-(β-diethylamino-ethyl)-3,5-dioxo-1,2,4-triazolidine were obtained; the compound was transformed in the naphthalene-1,5-disulfonate which was found to melt at 190–191° C.

Example 6

21.9 g. of 1-phenyl-2-isopropyl-3,5-dioxo-1,2,4-triazolidine were transformed in the sodium salt with the aid of 2.3 g. of sodium, finely dispersed in 350 cc. of toluene. 11.9 g. of β-dimethylamino-ethyl chloride were added and the mixture was heated for 2 hours at the boiling temperature. After the reaction mixture had cooled, it was shaken with dilute hydrochloric acid, the base was isolated in the usual manner from the hydrochloric solution and converted in the hydrochloride. 15.4 g. of 1-phenyl-2-isopropyl-4-(β-dimethylamino-ethyl)-3,5-dioxo-1,2,4-triazolidine hydrochloride having a melting point at 218° C. (from isopropanol) were obtained.

Example 7

When working according to the method described under 1 (a) but with 26.7 g. of 1-phenyl-2-benzyl-3,5-dioxo-1,2,4-triazolidine, 8.3 g. of sodium isopropylate in 400 cc. of isopropanol, and 15 g. of β-diethylaminoethyl chloride, there were obtained 34.6 g. of 1-phenyl-2-benzyl-4-(β-diethylamino-ethyl)-3,5-dioxo-1,2,4-triazolidine which was converted with hydrochloric acid in isopropanol into the hydrochloride melting at 115° C.

Example 8

A suspension of 21.3 g. of anhydrous sodium salt of 1-phenyl-2-methyl-3,5-dioxo-1,2,4-triazolidine in 250 cc. of toluene was heated to the boiling temperature with 19 g. of bromoacetaldehyde-diethyl acetal until the smell of bromacetal could not longer be observed. After the reaction mixture had cooled, it was stirred with dilute sodium hydroxide solution and water and the toluene layer was evaporated in water-jet vacuum after having been dried by means of potassium carbonate. The crude [1-phenyl-2-methyl-3,5-dioxo-1,2,4-triazolidyl-(4)]-acetaldehyde-diethylacetal was dissolved in 200 cc. of dioxane and, after the addition of some drops of concentrated hydrochloric acid, it was heated for a short period to the boiling temperature. The solvent was distilled off, the residue was dissolved in methanol and, after addition of an excess quantity of diethylamine and 0.3 g. of platinum oxide, it was hydrogenated at room temperature with a slight overpressure of hydrogen. When the uptake of hydrogen had ceased, the mixture was separated from the catalyst by suction-filtration, the solution was evaporated and the residue was taken up in benzene and dilute hydrochloric acid. The hydrochloric solution was then strongly diluted with water, treated with charcoal, and rendered alkaline with sodium carbonate. The oily base that had separated was isolated in the usual manner (6.1 g.) and dissolved in ethanol; an ethanolic solution of naphthalene-1,5-disulfonic acid was then added to this solution until it showed an acid reaction to Congo paper. Upon inoculation and cooling, there was obtained a salt which was found to melt at 208° C. after recrystallization from methanol and which was found to be identical with the 1-phenyl-2-methyl-4-(β-diethylamino-ethyl)-3,5-dioxo-1,2,4-triazolidine-naphthalene-1,5-disulfonate described in Example 1.

Example 9

(a) 19.1 g. of 1-phenyl-2-methyl-3,5-dioxo-1,2,4-triazolidine were brought into suspension in 100 cc. of acrylonitrile. Upon addition of 3 cc. of a solution of 35% strength of trimethylbenzyl-ammonium hydroxide in methanol, the mixture was stirred for 2 hours at 60° C., whereupon the major part of the triazolidine dissolved. The reaction mixture was suction-filtered, the excess acrylonitrile was distilled off in a water-jet vacuum and the residue was taken up in acetone. After having been acidified, the acetone solution was poured into water, whereupon 1-phenyl-2-methyl-4-(β-cyano-ethyl)-3,5-dioxo-1,2,4-triazolidine precipitated in crystalline form. The compound (22 g.) was found to melt at 122° C., after recrystallization from ethanol.

(b) 12.2 g. of 1-phenyl-2-methyl-4-(β-cyano-ethyl)-3,5-dioxo-1,2,4-triazolidine were hydrogenated in conventional manner in methanol and in the presence of ammonia and Raney nickel. After the uptake of hydrogen was terminated, the mixture was suction-filtered from the catalyst and the filtrate was evaporated. The residue was dissolved in 100 cc. of formic acid of 90% strength and, after addition of 50 cc. of a formaldehyde solution of 30% strength, it was heated for some hours on the steam bath. The reaction solution was then diluted with water, suction-filtered with charcoal and rendered alkaline with the aid of sodium carbonate. The oil that had separated was isolated by extraction with ether. 5.2 g. of 1-phenyl-2-methyl-4-(γ-dimethylamino-propyl)-3,5-dioxo-1,2,4-triazolidine were obtained; the hydrochloride of this compound was found to melt (after recrystallization from isopropanol) at 160–161° C.

We claim:

1. A compound selected from the group consisting of basically substituted triazolidines of the formula

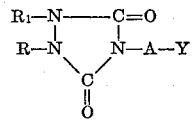

in which R represents phenyl, $R_1$ represents a member selected from the group consisting of lower alkyl and phenyl lower alkylene, A represents an alkylene group having 2 to 4 carbon atoms, Y represents a member selected from the group consisting of

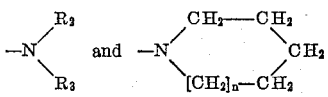

wherein $R_2$ and $R_3$ each represent lower alkyl, $n$ represents an integer from 0 to 1, inclusive, and physiologically compatible acid addition salts thereof.

2. The 1-phenyl-2-methyl-4-(β-diethylamino-ethyl)-3,5-dioxo-1,2,4-triazolidine.

3. The 1-phenyl-2-methyl-4-(γ-dimethylamino-propyl)-3,5-dioxo-1,2,4-triazolidine.

4. The 1-phenyl-2-methyl-4-(β-piperidino-ethyl)-3,5-dioxo-1,2,4-triazolidine.

5. The 1-phenyl-2-methyl-4-(β-dimethylamino-ethyl)-3,5-dioxo-1,2,4-triazolidine.

6. The 1-phenyl-2-isopropyl-4-(β-dimethylamino-ethyl)-3,5-dioxo-1,2,4-triazolidine.

7. The 1-phenyl-2-isopropyl-4-(β-diethylamino-ethyl)-3,5-dioxo-1,2,4-triazolidine.

8. The 1-phenyl-2-benzyl-4-(β-diethylamino-ethyl)-3,5-dioxo-1,2,4-triazolidine.

References Cited by the Examiner

UNITED STATES PATENTS

| Re. 25,238 | 9/62 | Carboni | 260—308 |
| 1,915,334 | 6/33 | Salzberg et al. | 260—243 |
| 2,075,359 | 3/37 | Salzberg et al. | 167—22 |
| 2,470,085 | 5/49 | Harvill et al. | 260—308 |
| 2,890,984 | 6/59 | Sahyun | 167—65 |
| 2,899,359 | 8/59 | Fancher et al. | 167—65 |
| 3,000,885 | 9/61 | Cusic | 260—294.3 |

FOREIGN PATENTS

| 1,244,321 | 9/60 | France. |
| 883,219 | 11/61 | Great Britain. |

OTHER REFERENCES

Mitchell et al., "J. Am. Pharm. Assoc.," vol. 48, pages 122–6 (1959).

NICHOLAS S. RIZZO, *Primary Examiner.*

DUVAL T. McCUTCHEN, *Examiner.*